Patented Dec. 24, 1940

2,226,142

UNITED STATES PATENT OFFICE 2,226,142

PROCESS FOR IMPROVED COLORED TITANIUM PIGMENTS

Holger H. Schaumann, Roselle, Del., assignor to E. I. du Pont de Nemours & Company, Wilmington, Del., a corporation of Delaware No Drawing. Application September 3, 1938, Serial No. 228,403

16 Claims. (Cl. 134—58)

This invention relates to a process for the production of improved colored titanium pigments adapted to exhibit cleaner colors and improved color stability. More specifically, it relates to the production of improved chromium-containing colored titanium oxide pigments.

A process for the production of colored titanium pigments is described in U. S. Patent 2,062,137, wherein, in one embodiment, chromium compounds are added to titanium oxide prior to calcination, such calcination producing a buff colored pigment. Such pigment exhibits definite and superior advantages as regards chalking and fading properties, and is especially adapted for use in outside paints. While exhibiting certain desired and improved characteristics in such coating compositions, the pigment, at times, objectionably modifies in tint. Thus, for example, the buff color is oftentimes modified by a greenish tint, and this, in certain instances, may prove detrimental to pigment use.

It is accordingly among the objects of this invention to overcome this disadvantage in colored titanium pigments and to provide a novel method for rendering the same stable toward color change. An additional object includes the provision of a process for the production of yellow to buff colored titanium oxide pigment of improved and relatively clean undertone. Another object is the production of buff or yellow colored titanium pigments which show an improved resistance to change of tint or color on exposure to light and to air. A still further object is the production of yellow to buff colored titanium pigments containing a minor amount of chromium, which pigment, when mixed with paint vehicles, and with or without extenders, forms relatively stable paints, characterized by improved non-fading and non-chalking properties. Other objects will appear hereinafter.

These and other objects are accomplished by this invention, which broadly comprises treating a colored titanium pigment and especially colored pigments such as disclosed in McKinney et al. U. S. Patent 2,062,137 with a relatively strong oxidizing agent.

In a more specific and preferred embodiment the invention comprises treating an aqueous suspension of a colored, chromium treated titanium oxide pigment with a relatively small amount of an oxidizing agent adapted to convert the chromium present to a state of higher valency and then digesting the mixture to render the resultant pigment stable and resistant to color change, especially upon exposure to light and/or air.

In adapting the invention to preferred practice the colored chromium treated titanium oxide pigment to be treated may be prepared in accordance with methods outlined in said McKinney, et al. Patent 2,062,137, e. g. by calcining the titanium oxide with minor quantities of chromium compounds, such as the water insoluble oxides or hydroxides of the metal or its soluble salts such as the chloride, sulfate, nitrate, etc. Conveniently, to an aqueous suspension of the calciner discharge from such process (after suitable wet grinding to induce desired pigment texture and fineness) a small amount of hydrogen peroxide is added, say from about 0.1 to about 4 parts by weight per 100 parts by weight of pigment. The slurry, while maintained on the alkaline side, i. e. in excess of a pH value of 7 and preferably in excess of 9, is then agitated by efficient stirring, and sufficient time allowed to lapse to permit digestion and enable the oxidizing agent to remove the greenish tint which the buff colored pigment at the start of treatment exhibits. After a suitable period of digestion (usually about one to three hours), the slurry is filtered and the filtered material is then washed and dried, the pigment being then ready for paint or other coating composition use. As a result of such treatment it will be found that the pigment which possesses a somewhat greenish buff color at the commencement of treatment has its greenish tint completely removed, and the pigment exhibits a relatively clean color, much more pleasing to the eye and more suitable for use in colored titanium paints.

In order that the invention may be more particularly described, the following illustrative examples are given, none of which is to be considered as in any wise limiting the invention:

Example 1

500 parts by weight of chromium containing pigment of medium buff color possessing a greenish tint were mixed with 1,500 parts of water and slurried to a uniform consistency. To this slurry was added 1.75 parts by weight of sodium hydroxide and 15 parts by weight of 25% hydrogen peroxide solution and the mixture was then agitated in a tank. After stirring for one hour the slurry was filtered, dried and pulverized. The resulting pigment showed a clean, yellowish buff of permanent color on exposure to air and was free of the greenish tint in the original.

Example 2

Four parts by weight of 30% hydrogen peroxide solution were added to an aqueous suspension containing 700 parts of a buff chromium containing TiO₂ pigment in finely dispersed condition. The suspension was stirred for 16 hours, filtered, dried and dry milled by passage thru a pigment disintegrator. The product was found to be of a clean buff color and free of its original greenish tint.

*Example 3*

A batch ball mill was charged with 700 parts by weight of a calcined greenish buff chromium containing titanium dioxide pigment, two thousand parts by weight of water and 1.05 parts by weight of sodium hydroxide and 10 parts of 30% hydrogen peroxide. The mill was turned for 12 hours after which the charge was filtered, dried and disintegrated as in the previous example. The pigment upon test was found to have been freed of its greenish tint and was then a clean buff pigment of superior color and exhibited excellent color stability upon exposure in paint films.

*Example 4*

A batch ball mill was charged with 200 parts by weight of the pigment used in Example 3, 600 parts by weight of water, 2 parts by weight of NaBO₃4H₂O and 0.3 part by weight of sodium hydroxide. The mill was then turned for a period of 16 hours, after which the charge was filtered, dried and pulverized as in the preceding example. The product was equally good in color and exhibited the color stability of the highest order when exposed in exterior paint films.

*Example 5*

Two hundred parts of chromium containing buff pigment having a greenish tint, 500 parts of water and 2 parts of ammonium persulfate, along with sufficient caustic soda to raise the pH of the slurry to 9, was charged into a batch ball mill and processed as in the preceding example. The resulting pigment was very similar in color and color stability to the pigment of the previous example, and far superior to the initial product.

*Example 6*

Two hundred parts of pigment, 900 parts of water in the form of a hydroseparator overflow in dispersed condition was placed in a tank, and 2 parts by weight of ammonium persulfate was added. The material in the tank was agitated overnight and the suspension was then coagulated by addition of sulfuric acid to give a pH value of 6.9. The material was later filtered, washed and dried. Subsequently, the product was disintegrated and tested for color and color stability by exposure in an outside house paint. The pigment was found to have an excellent buff tint, substantially free of greenish undertone and stable in color. In this respect it was far superior to the material which did not have the ammonium persulfate treatment.

As shown by the foregoing examples, the invention is especially valuable in correcting the undertone of chromium containing buff titanium oxide pigments. Such pigments are normally calcined at temperatures in excess of 900° C., and under certain conditions a greenish tint develops. This is especially true as the calcination temperature increases, this being desirable in the production of the darker buff pigments. By the instant process, one is able to obtain the greatest effect of the tinting chemical, i. e., to produce the darker shades with a minimum amount of chromium compound. Furthermore, development of maximum tinting strength even at the disadvantage of objectionable tint or undertone (usually greenish but in some cases brownish) is afforded, since the use of the instant oxidizing treatment effectively removes this objectionable discoloration and affords the production of a high grade pigment. Previously, it was not known how to correct this greenish tint, and, as a result, the products did not possess the combination of a high strength, superior durability and non-fading characteristics which is now possible thru the adoption and practice of this process.

While specific types and amounts of oxidizing agents have been set out above as usefully employable in the invention, the use of other amounts and types of oxidizing agents is contemplated. Most common liquid and solid oxidizing agents may be used, although preferably those which are colorless and possess a strong oxidizing function in alkaline liquors, such as the peroxides of hydrogen sodium or barium are employed. Similarly, agents which on reduction do not leave a colored residue on the titanium pigment, nor affect the desired tint of the pigment are also preferred. While generaly the invention has application to rendering all types of tinted titanium oxide pigments stable, in the specific instance of the preferred treatment of chromium-treated pigments, it will be found desirable to employ those agents which function to convert the chromium to the hexavalent state and conjointly fail to influence the color of the bleached pigment. In addition to the preferred agents hydrogen, sodium or barium peroxide, examples of other agents include potassium chlorate, the salts of persulfuric and perboric acids and the like.

As indicated, the amount of oxidizing agent, or mixtures of oxidizing agents to be employed is variable, and depends to a large extent upon the tint correction desired. Usually, from about 0.05 to about 10 parts by weight of oxidizing agent per 100 parts by weight of pigment suffices for all practical purposes, although higher concentrations may, if desired, be employed. Preferably, relatively small amounts are resorted to and to the extent of approximating the lower end of the range given, unless an extreme case is presented, and substantial tint correction is required. However, for most practical purposes and to procure optimum benefits, use of an amount of agent, or mixtures thereof, ranging from about 0.1 to 4 parts of agent per 100 parts of pigment is preferred. The above figures are based on the anhydrous reagent, as for instance, the actual weight of H₂O₂ contained in the solution being added to the titanium oxide pigment slurry.

Where the oxidizing agent such as hydrogen peroxide is normally in solution, the desired amount may be added directly to an aqueous suspension of the pigment. In instances where it is insoluble in water, such as barium peroxide, the agent may be added directly to the pigment slurry and heat applied to effect digestion at an elevated temperature sufficiently high to effect decomposition of the agent. Alternatively the barium peroxide may be added to water, the latter acidulated to effect decomposition of the agent to form H₂O₂, and the resultant solution then added to the pigment suspension to effect desired oxidation.

In instances where the calciner discharge is to be treated in accordance with the invention, grinding of the pigment may be effected in accordance with methods disclosed in U. S. Patent 1,937,037, and the oxidizing agent added to the uncoagulated hydroseparator overflow. This suspension usually runs from about 100 to 125 grams TiO₂ per liter and has a pH of between 9 and 10.

The above examples disclose the treatment of a pigment in particular aqueous suspensions and at an alkaline pH. The concentration of the slurry is generally not an important matter, but preferably slurry concentrations in excess of 100 grams per liter are resorted to. Suspensions as concentrated as can be agitated, pumped and transferred may also be employed and are likewise contemplated. The time of contact of the oxidizing agent with the titanium pigment slurry is also subject to wide variance. Usually at least one hour, and preferably at least three hours is consumed during the digestion. If desired, as much as 24 hours or more may be consumed where one wishes to use completely the oxidizing agent. While times in excess of 24 hours are permissible, economic reasons dictate their non-necessity. The pH value of the slurry under treatment will be found more important. Usually, the reaction takes place much more rapidly if a pH value in excess of 7 and preferably in excess of 9 is used as has been indicated. If the slurry has a slight acidity, that is, if the pH value is below 7, some bleaching action will occur but not at the rate and to the extent desired. Accordingly, it is definitely advantageous to maintain a pH value above the neutral point and preferably between the values of 9 and 11.

In the instance of the treatment of chromium treated pigments, the value of the invention seems to be due to the removal of trivalent chromium by oxidation to the hexavalent state. This seems a reasonable and satisfactory explanation of results which obtain in the invention. As much chromium is removed as is soluble during filtration and washing. Some chromium is left in the pigment, since the calcination process combines some chromium with the titanium and this is probably present in the hexavalent condition and is believed to be a fundamental part of the titanium oxide pigment particles.

It is to be understood that this invention has general application to tinted titanium oxide pigments and is not limited to treatment of titanium oxide pigments in the absence of modifying agents or extenders. Thus it applies to the treatment of so-called extended titanium oxide pigments containing blended, or coalesced or precipitated barium sulfate, calcium sulfate, or silicates, etc.

I claim:

1. A process for removing the greenish tint from titanium oxide pigments tinted through co-calcination with a minor amount of a chromium compound, comprising subjecting said pigment while in aqueous alkaline suspension to the action of a strong oxidizing agent, the amount of agent so employed being from about .05 to about 10 parts by weight per 100 parts of pigment.

2. A process for producing a stable, titanium oxide pigment tinted through co-calcination with a minor amount of a chromium compound, comprising digesting said pigment while in aqueous suspension for a period of at least one hour in the presence of an oxidizing agent, the amount of agent so employed being from about .05 to about 10 parts by weight per 100 parts of pigment.

3. A process for stabilizing titanium oxide pigments, tinted through co-calcination with a minor amount of a chromium compound, comprising digesting said pigment in the presence of from about .05 to about 10 parts by weight of an oxidizing agent per 100 parts of pigment for a period of time sufficient to convert the chromium present to the hexavalent state.

4. A process for stabilizing a titanium oxide pigment tinted through co-calcination with a minor amount of a chromium compound, comprising digesting said pigment in aqueous suspension in the presence of from about 0.05 to about 10 parts by weight of an oxidizing agent per 100 parts of pigment.

5. A process for stabilizing a titanium oxide pigment tinted through co-calcination with a minor amount of a chromium compound, comprising digesting said pigment in aqueous suspension in the presence of from about .1 to about 4 parts by weight of an oxidizing agent per 100 parts of pigment.

6. A process for stabilizing a titanium oxide pigment tinted through co-calcination with a minor amount of a chromium compound, comprising subjecting said pigment to digestion in the presence of from about .05 to about 10 parts by weight of a peroxide.

7. A process for stabilizing a titanium oxide pigment tinted through co-calcination with a minor amount of a chromium compound, comprising subjecting said pigment to digestion in the presence of from about .1 to about 4 parts by weight of sodium peroxide.

8. A process for stabilizing a titanium oxide pigment tinted through co-calcination with a minor amount of a chromium compound, comprising subjecting said pigment to digestion in the presence of from about .1 to about 4 parts by weight of barium peroxide.

9. A process for stabilizing a titanium oxide pigment tinted through co-calcination with a minor amount of a chromium compound, comprising subjecting said pigment to digestion in the presence of from about 0.05 to about 10 parts by weight of hydrogen peroxide.

10. A process for stabilizing a titanium oxide pigment tinted through co-calcination with a minor amount of a chromium compound, comprising subjecting said pigment to digestion in the presence of from about .1 to 4 parts by weight of hydrogen peroxide.

11. A process for stabilizing a titanium oxide pigment tinted through co-calcination with a minor amount of a chromium compound, comprising subjecting said pigment to digestion in the presence of from about 0.05 to about 10 parts by weight of barium peroxide.

12. A process for stabilizing a titanium oxide pigment tinted through co-calcination with a minor amount of a chromium compound, comprising subjecting said pigment to digestion in the presence of from about 0.05 to about 10 parts by weight of sodium peroxide.

13. A process for producing a stable titanium oxide pigment tinted through co-calcination with a minor amount of a chromium compound, comprising subjecting said calcined pigment while in aqueous suspension to the action of a relatively strong oxidizing agent, the amount of agent so employed being from about .05 to about 10 parts by weight per 100 parts of pigment.

14. A process for stabilizing the color or tint of a tinted titanium oxide pigment obtained by calcining titanium oxide in the presence of a colored metal oxide the metal component of which has a variable valence, which comprises intimately associating from about .05 to about 10 parts by weight of an oxidizing agent with said previously calcined pigment.

15. A process for stabilizing the color or tint of a tinted titanium oxide pigment obtained by calcining precipitated titanium oxide in the presence of a colored metal oxide the metal component of which has a variable valence, which comprises for a period of at least one hour digesting said previously calcined pigment while in aqueous suspension in the presence of from about .05 to about 10 parts by weight of an oxidizing agent.

16. A process for treating a titanium oxide pigment tinted through co-calcination with a minor amount of a colored metal oxide, the metal component of which has a variable valence, to stabilize said pigment against color change, which comprises subjecting said tinted calcined pigment, while in aqueous suspension, to the action of from about .05 to about 10 parts by weight of a relatively strong oxidizing agent per 100 parts of pigment.

HOLGER H. SCHAUMANN.